Figure 1:
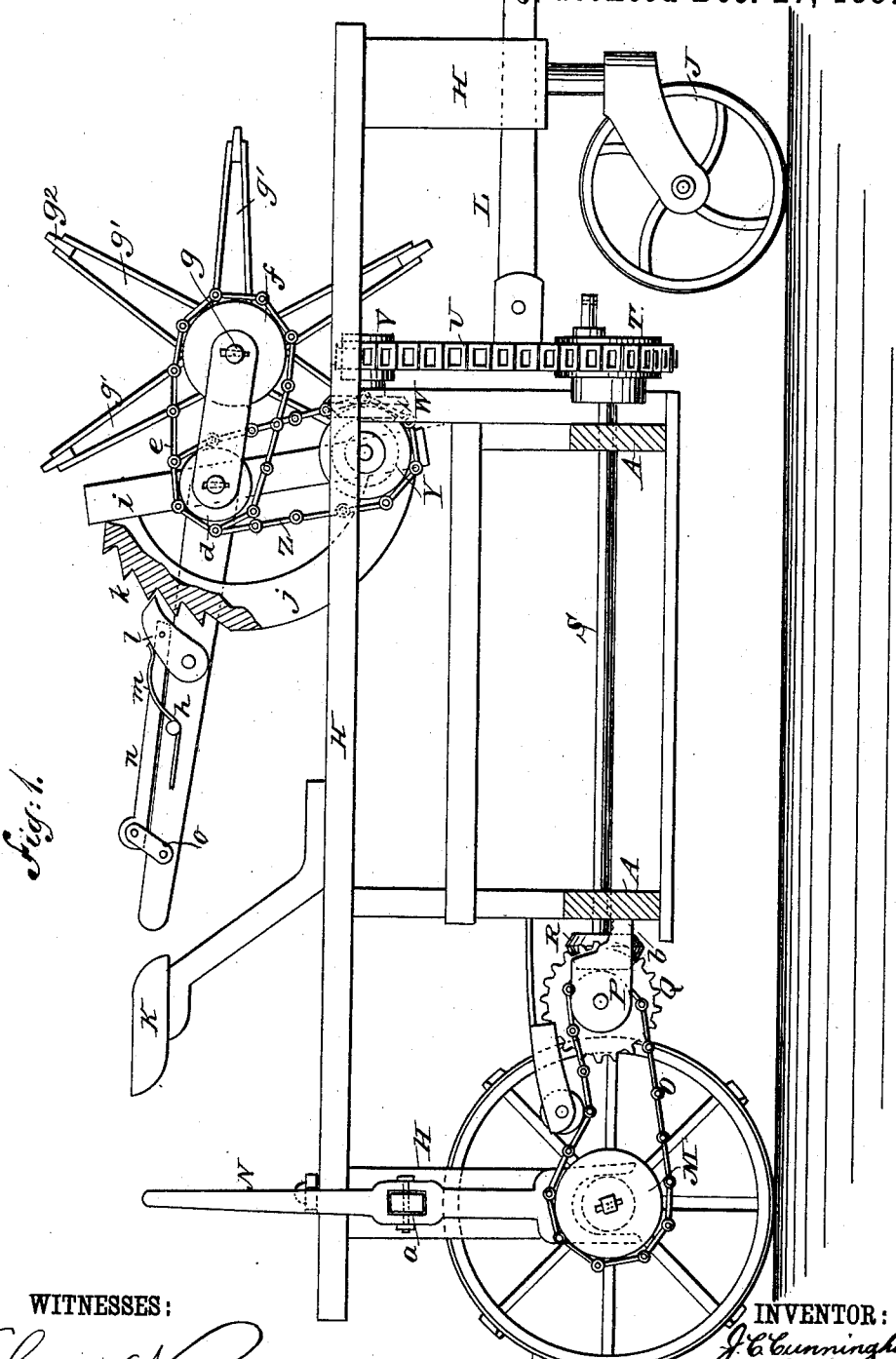

(No Model.) 2 Sheets—Sheet 1.

J. C. & G. A. CUNNINGHAM.
REEL FOR HARVESTERS.

No. 375,694. Patented Dec. 27, 1887.

WITNESSES:
Chas. Nida
C. Sedgwick

INVENTOR:
J. C. Cunningham
G. A. Cunningham
BY Munn & Co.
ATTORNEYS.

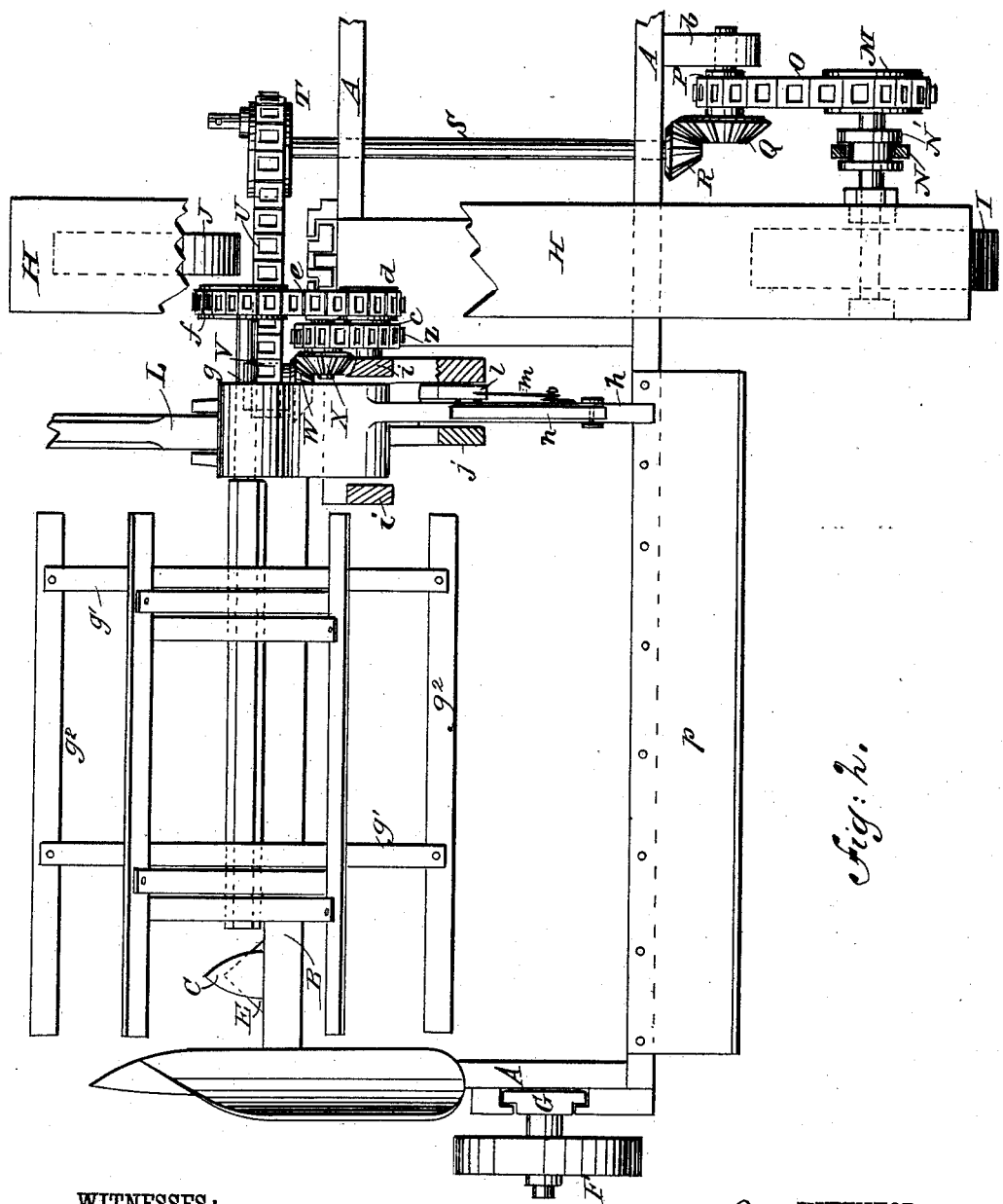

UNITED STATES PATENT OFFICE.

J. CALDER CUNNINGHAM AND GEORGE A. CUNNINGHAM, OF WASHINGTON, KANSAS.

REEL FOR HARVESTERS.

SPECIFICATION forming part of Letters Patent No. 375,694, dated December 27, 1887.

Application filed September 21, 1885. Serial No. 177,708. (No model.)

*To all whom it may concern:*

Be it known that we, J. CALDER CUNNINGHAM and GEORGE A. CUNNINGHAM, of Washington township, in the county of Jackson, (St. Mary's post-office, county of Pottawatomie,) State of Kansas, have invented a new and useful Improvement in Reels for Harvesters, of which the following is a full, clear, and exact description.

Reference is to be had to the accompanying drawings, forming part of this specification, in which similar letters of reference indicate corresponding parts in both the figures.

Figure 1 is a side elevation of a harvester to which our improved reel has been applied, partly in section, and parts being broken away. Fig. 2 is a plan view of the same, partly in section, and parts being broken away.

The object of this invention is to provide reels for harvesters constructed in such a manner that they can be readily raised and lowered and will be securely held in every position.

The invention consists in the combination, with the reel and its driving mechanism, of an adjusting and holding mechanism, such as will be hereinafter fully described, and then pointed out in the claim.

This invention is restricted to the reel and its operating mechanism, the other features shown in connection therewith being the same as those shown in my Patent No. 338,219, and granted March 16, 1886.

Referring to the drawings by letter, A represents the platform-frame, to the front of which is attached a finger-bar, B, having guard-fingers C, and provided with a sickle-bar having cutters E, working in the said guard-fingers C.

F is a wheel for supporting the grain end of the harvester, having its journal attached to the slide G, which works in ways on the frame A.

H is a frame, in the rear end of which is journaled the drive-wheel I and in the forward end the caster-wheel J. Supported upon the frame H is the seat K, and to the forward part of the machine is hinged the tongue L. The outer journal of the drive-wheel I projects, and upon it is mounted the chain-wheel M.

N is a lever pivoted to the frame at *a*, and by means of which the clutch N' is operated.

O is an endless chain passing around the chain-wheel M and the chain-wheel P, mounted in a bracket, *b*, on the frame A. To the chain-wheel P is connected a bevel gear-wheel, Q, the teeth of which mesh into the teeth of a small beveled wheel, R, on the shaft S. On the forward end of the shaft S is mounted the chain-wheel T, around which passes the endless chain U. The endless chain passes around the chain-wheel V, to which is connected the beveled gear-wheel W, the teeth of which mesh with the teeth of the beveled gear-wheel X. With the beveled gear-wheel X is rigidly connected the chain-wheel Y, around which passes the endless chain Z. The endless chain Z also passes around the chain-wheel *c*. With the chain-wheel *c* is rigidly connected a chain-wheel, *d*, around which passes the endless chain *e*. The endless chain *e* also passes around the chain-wheel *f* on the end of the reel-shaft *g*, which revolves in the forward end of the lever *h*. The lever *h* passes through a slot in the upper end of the reel-post *i*, and is pivoted on the journal of the chain-wheels *c d*. The rear arm of the lever *h* passes through a slot in the curved catch-bar *j*, the ends of which are attached to the upper and lower parts of the reel-post *i*, and serves as a brace to strengthen the said lever against lateral movement. In the convex side of the catch-bar *j* are formed teeth *k*, with which engages the pawl *l*, pivoted to the lever *h*. The pawl *l* is held down against the teeth *k* by the spring *m*, attached to said lever.

To the forward part of the pawl *l* is pivoted the forward end of the bar *n*. The bar *n* rests and slides upon the upper side of the lever *h*, and is kept in place by a link, *o*, pivoted to it and to the said lever, or by other suitable guides or keepers. The outer end of the bar *n* is enlarged or provided with a handle for convenience in operating it to withdraw the pawl *l* from the catch-teeth *k*, to allow the lever *h* to be operated to raise and lower the reel as the height of the grain may require. The reel-shaft *g* is provided with the arms *g'* and the bars *g²* in the ordinary manner. *p* is an inclined grain-guard plate attached to the rear part of the platform of the frame A.

Having thus fully described our invention, we claim as new and desire to secure by Letters Patent—

In a grain-harvester, the combination, with the reel-post $i$, provided with the slotted and curved rack-bar $j\ k$, of the lever $h$, fulcrumed on the post $i$, the reel-shaft $g$, journaled in the end of the said lever, the chain-wheel $f$ on the reel-shaft, the chain-wheels $c\ d\ Y$, journaled in the reel-post, the pawl $l$, the spring $m$, the sliding bar $n$, and means for operating the chain-wheel $Y$ from the drive-wheel, substantially as herein shown and described.

J. CALDER CUNNINGHAM.
GEORGE A. CUNNINGHAM.

Witnesses:
Z. T. TRUMBO,
O. H. McHALE.